US012695204B2

(12) United States Patent
Au

(10) Patent No.: US 12,695,204 B2
(45) Date of Patent: Jul. 28, 2026

(54) FREQUENCY SELECTIVE SURFACE FOR AN ACCESS POINT ANTENNA

(71) Applicant: T-MOBILE INNOVATIONS LLC, Overland Park, KS (US)

(72) Inventor: Chad Chun Fai Au, Kirkland, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 132 days.

(21) Appl. No.: 18/392,524

(22) Filed: Dec. 21, 2023

(65) Prior Publication Data

US 2025/0210874 A1 Jun. 26, 2025

(51) Int. Cl.
*H01Q 1/42* (2006.01)
*H01Q 1/24* (2006.01)
*H01Q 15/00* (2006.01)
*H01Q 19/02* (2006.01)

(52) U.S. Cl.
CPC ......... *H01Q 15/0013* (2013.01); *H01Q 1/246* (2013.01); *H01Q 1/42* (2013.01); *H01Q 19/027* (2013.01)

(58) Field of Classification Search
CPC ...... H01Q 1/246; H01Q 1/42; H01Q 15/0013; H01Q 19/027
See application file for complete search history.

(56) References Cited

U.S. PATENT DOCUMENTS 12,362,461 B2 * 7/2025 Li .......................... H01Q 1/246
2024/0347909 A1 * 10/2024 Hsu ...................... H01Q 21/065

FOREIGN PATENT DOCUMENTS

CN 113991301 A * 1/2022 ............. H01Q 21/28

* cited by examiner

*Primary Examiner* — Daniel Munoz
(74) *Attorney, Agent, or Firm* — SHOOK, HARDY & BACON L.L.P.; Elena K. McFarland

(57) ABSTRACT

Methods, apparatus, and a non-transitory computer readable media provide an access point antenna with an antenna radome comprising frequency selective surface elements. At least one first antenna element mounted on a first location of an antenna support structure and at least one second antenna element mounted on a second location of the antenna support structure. The antenna radome covers the access point antenna and comprises frequency selective surface components on an interior surface. The frequency selective surfaces comprise first and second frequency selective surface components that are responsive to filter unwanted radio frequency (RF) emissions that affect the first and second antenna elements. The frequency selective surfaces comprising the antenna radome may be selected based on the location and frequencies of other antennas operating near the access point antenna.

20 Claims, 6 Drawing Sheets

FREQUENCY SELECTIVE SURFACE FOR AN ACCESS POINT ANTENNA

BACKGROUND

Current access point antennas experience a gradual roll-off or degradation in performance beyond the frequency band the antenna is designed to operate on. This gradual roll-off in performance allows potential interference from other antennas in the regions where the roll-off occurs. The access point antenna functions appropriately over a desired frequency band, however, the access point antenna also responds to frequencies outside of the intended operating frequency band. When this occurs, radio system performance for users degrades because noise levels in the receiver are elevated. Limited space for mounting access point antennas on cell towers or roof tops prohibits interference mitigation by spatial separation of the mutually interfering access point antennas.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and apparatus for an access point antenna comprising frequency selective surface elements is provided. There is at least one first antenna element mounted on a first location of an antenna support structure. In addition, there is at least one second antenna element mounted on a second location of the antenna support structure. The antenna support structure is covered by an antenna radome. The antenna radome comprises frequency selective surface components on an interior surface of the antenna radome. The frequency selective surfaces comprise at least one first frequency selective surface component that is responsive to filter unwanted radio frequency (RF) emissions that affect at least one first antenna element. At least one second frequency selective surface component is provided, which is responsive to filter unwanted RF emissions that affect the at least one second antenna element. The frequency selective surfaces comprising the antenna radome may be selected based on the location and frequencies of other antennas operating near the access point antenna.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
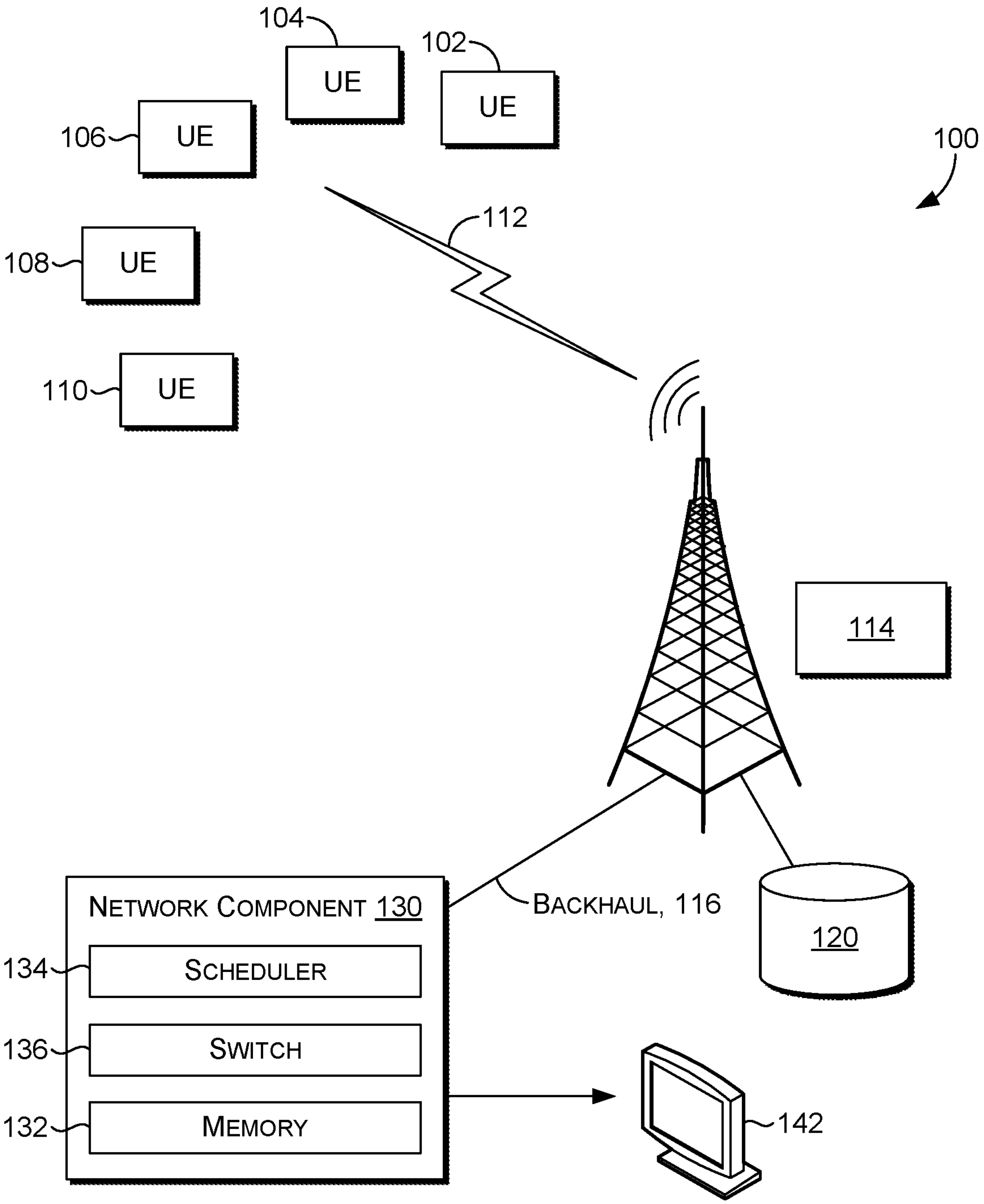
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure.

Further, various technical terms are used throughout this description. An illustrative resource that fleshes out various aspects of these terms can be found in Newton's Telecom Dictionary, $32^{nd}$ Edition (2022).

Aspects disclosed herein provide for an access point antenna comprising frequency selective surfaces. The frequency selective surfaces are provided on an inside surface of a radome covering the access point antenna. The access point antenna may be located on a tower or other environment where multiple antennas may be located in close proximity to one another. The antennas located in close proximity to the access point antenna may introduce interference that adversely affects the signal of the access point antenna. The frequency selective surfaces applied to the inside surface of the access point antenna radome provide an increased ability to filter unwanted RF emissions from the environment, whether from another nearby antenna or the surrounding area.

The design of the frequency selective surfaces mounted on the inside of the antenna radome may be adapted to shape the access point antenna radiation pattern in order to limit emissions from the access point antenna in azimuth to the sides, thus reducing interference to other antennas from the access point antenna. The frequency selective surfaces on the antenna radome may be selected and located on the interior surface of the antenna radome based on the operating frequencies of antennas operating on the same tower or installation location and may be selected to reduce interference received by the access point antenna. The antennas causing interference to the access point antenna may be physically close in location and may also use neighboring frequency blocks. Additional challenges arise with more power input to mobile network frequency bands and the increasing use of multiple-input multiple-output (MIMO) systems.

Embodiments of the present technology may be embodied as, among other things, a method, system, apparatus, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of access points (i.e., access point, node, cell sites, cell towers) to provide network coverage. The access points are employed to broadcast and transmit transmissions to user devices of the telecommunications network. An access point may be considered to be a portion of an access point that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, an access point may comprise one access point or more than one access point. Factors that can affect the telecommunications transmission include, e.g., location and size of the access points, and frequency of the transmission, among other factors. The access points are employed to broadcast and transmit transmissions to user devices of the telecommunications network. Traditionally, the access point establishes uplink (or downlink) transmission with a mobile handset over a single frequency, a block of frequencies, or multiple blocks of frequencies that is/are exclusive to that particular uplink connection (e.g., an LTE connection with an EnodeB). The access point may include one or more sectors served by individual transmitting/receiving components associated with the access point (e.g., antenna arrays controlled by an EnodeB). These transmitting/receiving components together form a multi-sector broadcast arc for communication with mobile handsets linked to the access point.

As used herein, "access point" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE). The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby access point. A UE may be, in an embodiment, similar to device 700 described herein with respect to FIG. 7.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), smart glasses or XR goggles, and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby access point or access point.

A first aspect of the present disclosure provides a method for congestion-based scheduling in a network, based on device capabilities. The access point antenna comprises frequency selective surface elements. The access point antenna comprises at least one first antenna element mounted on a first location of an antenna support structure and also comprises at least one second antenna element mounted on a second location of the antenna support structure. An antenna radome covers the antenna support structure and comprises frequency selective surface components mound on an interior surface of the antenna radome. The frequency selective surface components comprise at least one first frequency selective surface component that is responsive to filter unwanted RF emissions affecting at least one first an antenna element. Also provided is at least one second frequency selective surface component responsive to filter unwanted RF emissions affecting the at least one second antenna element.

A second aspect of the present disclosure provide a method for operating an access point antenna in a network. The method begins with receiving, from a user device, a signal on a first frequency. Next, the method continues with filtering, by at least one frequency selective surface responsive to the first frequency, unwanted RF emissions from adjacent antenna on the signal to produce a filtered signal. The filtered signal is then forwarded to a network switch for transmission.

Another aspect of the present disclosure is directed to a non-transitory computer storage media storing computer-usable instructions that cause the processors to receive, from a user device, a signal on a first frequency. Then, at least one frequency selective surface responsive to the first frequency filters unwanted RF emissions from adjacent antennas on the signal to produce a filtered signal. The instructions then forward the filtered signal to a network switch for transmission.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user devices or user equipment (UE) 102, 104, 106, 108, and 110, access point 114 (which may be a cell site, access point, or the like), and one or more communication channels 112. The communication channels 112 can communicate over frequency bands assigned to the carrier. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 700) that communicates via wireless communications with the access point 114 in order to interact with a public or private network. A UE may also be a wearable device such as a smart watch, smart glasses, fitness tracker or similar device.

Figure 7:
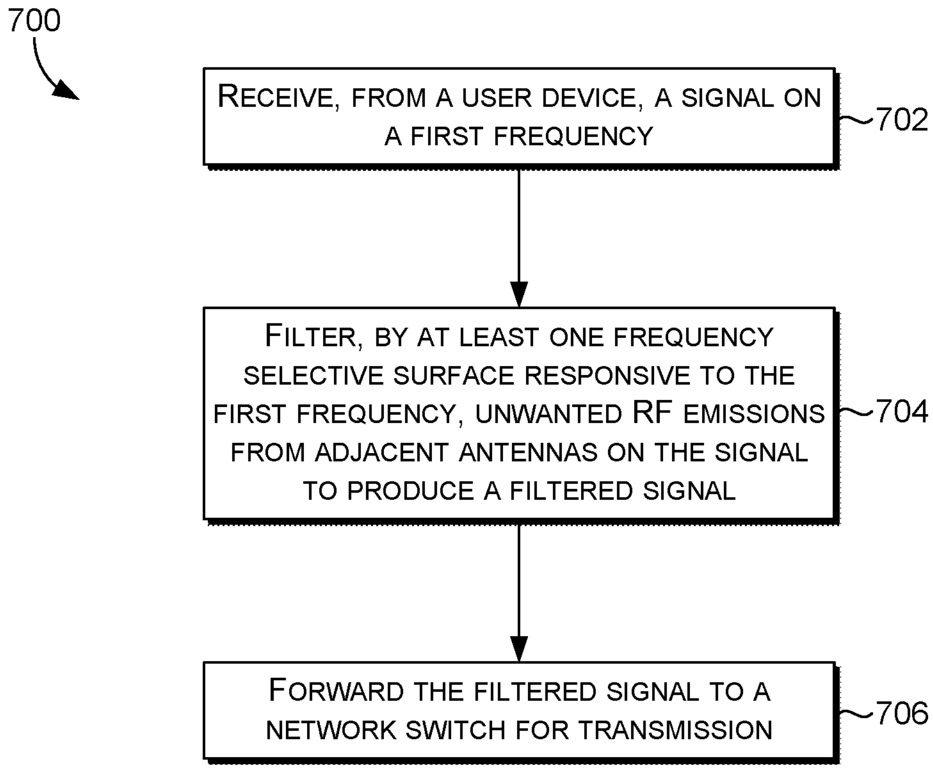
FIG. 7 depicts a flow diagram of an exemplary method for operating a multi-band access point antenna with a frequency selective surface radome, in accordance with aspects herein.

In some aspects, each of the UEs 102, 104, 106, 108, and 110 may correspond to computing device 700 in FIG. 7. Thus, a UE can include, for example, a display(s), a power source(s) (e.g., a battery), a data store(s), a speaker(s), memory, a buffer(s), a radio(s) and the like. In some implementations, for example, a UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, 6G, LTE, CDMA, or any other type of network. In some cases, UEs 102, 104, 106, 108, and 110 in network environment 100 can optionally utilize one or more communication channels 112 to communicate with other computing devices (e.g., a mobile device(s), a server (s), a personal computer(s), etc.) through access point 114.

The network environment 100 may be comprised of a telecommunications network(s), or a portion thereof. A telecommunications network might include an array of devices or components (e.g., one or more access points), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure. Network environment 100 may comprise equipment placed in network operator facilities, but may also comprise equipment located at a customer's premises, known as customer premises equipment (CPE).

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6 G, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network. The telecommunication network may also provide services using MU-MIMO techniques.

Figure 2:
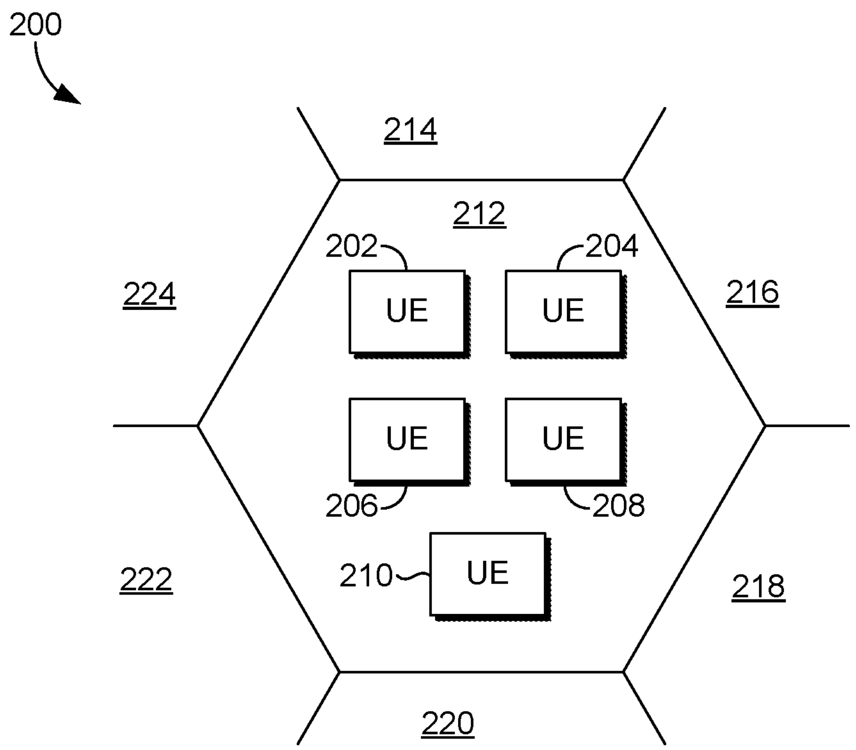
FIG. 2 depicts a cellular network suitable for use in implementations of the present disclosure, in accordance with aspects herein.

In some implementations, access point 114 is configured to communicate with a UE, such as UEs 102, 104, 106, 108, and 110, that are located within the geographic area, or cell, covered by radio antennas of access point 114. FIG. 2, below, illustrates multiple cells in a network. Access point 114 may include one or more access points, base transmitter stations, radios, antennas, antenna arrays, power amplifiers, transmitters/receivers, digital signal processors, control electronics, GPS equipment, and the like.

As shown, access point 114 is in communication with a network component 130 and at least a network database 120 via a backhaul channel 116. As the UEs 102, 104, 106, 108, and 110 collect individual signal information, the signal information can be automatically communicated by each of the UEs 102, 104, 106, 108, and 110 to the access point 114. Access point 114 may store the signal information and data communicated by the UEs 102, 104, 106, 108, and 110 at a network database 120. The signal information may comprise information signal metrics, which may include reference signal received power (RSRP), reference signal received quality (RSRQ), signal to interference and noise ratio (SINR), or other signal metrics. The signal information and data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the signal metrics stored in the network database 120 current. For example, the data may be received at or retrieved by the access point 114 every 10 minutes and the data stored at the network database 120 may be kept current for 30 days, which means that status data that is older than 30 days would be replaced by newer status data at 10 minute intervals. As described above, the status and signal metrics data collected by the UEs 102, 104, 106, 108, and 110 can include, for example, service state status, the respective UE's current geographic location, a current time, a strength of the wireless signal, available networks, and the like.

The network component 130 comprises a memory 132, a scheduler 134, and a switch 136. All determinations, calculations, and data further generated by the scheduler 134 may be stored at the memory 132 and also at the network database 120. The switch 136 may forward transmissions received at the access point 114 to the network for transmission to user devices in other cell sites. Computer terminal 142 is in communication with the network component 130 and with the memory 132, scheduler 134, and switch 136 through the network component 130. Although the network component 130 is shown as a single component comprising the memory 132, scheduler 134, and switch 136, it is also contemplated that each of the memory 132, scheduler 134, and switch 136 and may reside at different locations, be its own separate entity, and the like, within the home network carrier system.

The network component 130 is configured to retrieve network metrics and access point antenna signal quality metrics from the access point 114 or one of the UEs, 102, 104, 106, 108, and 110. The scheduler 134 can observe antenna signals on multiple frequencies over the network using antenna signal metrics such as SINR, RSRP, and RSRQ. The scheduler 134 may be located in a central office or other centralized location, but may also be mounted on an access point. The switch 136 may be located in a central office or other centralized location, but may also be mounted on an access point.

FIG. 2 depicts a cellular network suitable for use in implementations of the present disclosure, in accordance with aspects herein. For example, as shown in FIG. 2, each geographic area in the plurality of geographic areas may have a hexagonal shape such as a hexagon representing a geographic area 200 having cell sites 212, 214, 216, 218, 220, 222, 224, each including access point 114, backhaul channel 116, antenna for sending and receiving signals over communication channels 112, network database 120 and network component 130. The access point 114 may include one or more antennas mounted at the access point 114. The access point 114 antennas may be mounted on a tower that accommodates multiple antennas that operate a various frequencies. The various frequencies may belong to other network operators, broadcasting antennas, or other radio antennas. Other antennas serving other services may also be located near the access point 114 or use frequencies near frequencies used by the antennas of the access point 114. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. The UE data may include received signal quality information or interference information. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell site 212 and can move to other cells such as adjoining cell sites 214, 216, 218, 220, 222 and 224.

Figure 3:
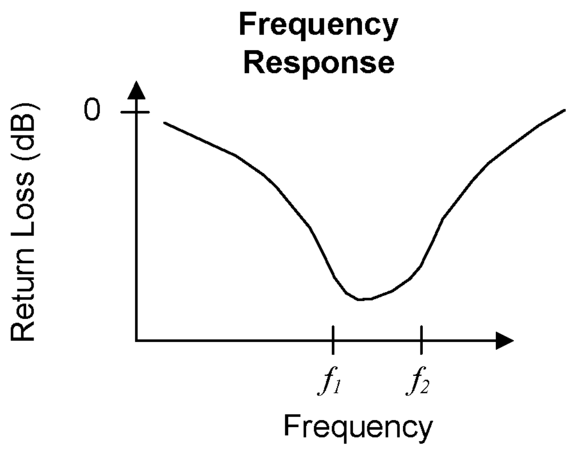
FIG. 3 depicts a frequency response diagram for an access point antenna, in accordance with aspects herein.

FIG. 3 depicts a frequency response diagram for an access point antenna, in accordance with aspects herein. Antennas are designed to operate over a band of selected frequencies with a desired radiation pattern and characteristics, such as: polarization, directionality, beam width, intensity of radiation, effective aperture, gain, radiation efficiency, and effective length. FIG. 3 illustrates an antenna frequency response in a selected frequency band between two frequencies f1 and f2. The frequency response outside the region between f1 and f2 is a gradual degradation in antenna performance. An antenna has a gradual frequency response roll-off outside of its resonant band, as illustrated in FIG. 3 with the curves trending toward zero. While the antenna may function well in the selected frequency band, between f1 and f2, the antenna may also respond to frequencies outside of the selected frequency band. This response to frequencies outside the selected frequency band may be a relatively slow rate of degradation.

The antenna frequency response can cause the antenna to be susceptible to external interference from adjacent frequencies. The adjacent frequencies cause elevated noise levels in a receiver in a device, such as user device, that receives signals from the antenna. As more user devices access more services on greater spectrum than before, interference from external emissions on adjacent frequencies can result in network performance degradation due to the elevated noise levels in the receivers of users.

Return loss is a measure of how small the return, or reflection, from an antenna is. Changes in the return loss from an antenna mean that the antenna is interacting with the surroundings. The surroundings may include other access point antennas mounted in the same location, even on the same access point tower. When an access point antenna interacts with surrounding antennas undesirable interference may be produced, resulting in an elevated noise level in the receiver, in this case, the user device receiver.

Antennas have an intrinsic three dimensional radiation pattern. A directional antenna has a peak radiation pattern that is broadside to the antenna aperture. The aperture of the antenna is a portion of a plane surface near then antenna that is perpendicular to the direction of maximum radiation where the greatest part of the radiation passes. The three dimensional radiation pattern decreases as the pattern moves away from the antenna boresight. The antenna boresight is the axis of maximum gain of the antenna. An antenna is considered boresighted when the electromagnetic axis and the mechanical axis are parallel. The roll off of an antenna radiation pattern refers to the steepness of a transfer function with frequency. Gain roll off is a function of beamwidth and specifies how much the antenna gain changes over the elevation angle of the antenna. In the increasingly crowded network deployment scenarios faced by network operators, it is preferable that the radiation pattern of an access point antenna roll off in an accelerated manner in order to reduce the amount of radiated power affecting adjacent antennas. The radiation pattern of a directional antenna is also the access point antenna's directional response for receiving signals. If radiation interfering with the access point antenna is to the side of the access point antenna making the access point antenna less responsive to the side will render the access point antenna less susceptible to interference.

Controlling the directionality of an access point antenna radiation pattern reduces interference to and from neighboring antennas. Frequency selective surfaces may alleviate the interference to access point antennas and may be used to shape and control the directionality of an antenna's radiation pattern. A frequency selective surface is a thin repetitive surface designed to reflect, transmit, or absorb electromagnetic fields based on the frequency of the field. A frequency selective surface can be used as a spatial filter because they can transfer or obstruct waves of selected frequencies in free space. The effect of a frequency selective surface is to allow propagation of desired frequencies and block other frequencies.

Figure 4:
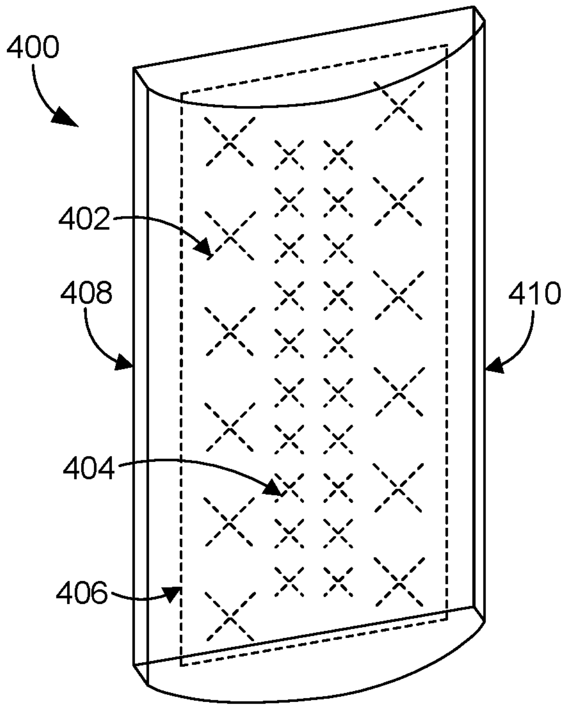
FIG. 4 depicts an access point antenna suitable for use in implementations of the present disclosure, in accordance with aspects herein.

FIG. 4 depicts a multi-band access point antenna 400 suitable for use in implementations of the present disclosure, in accordance with aspects herein. The access point antenna is a multiple band antenna with at least one low frequency band element 402 and at least one high frequency band element 404, which are mounted on a reflector 406. The reflector 406 is mounted on an antenna support structure 408. The antenna support structure, reflector 406, at least one low frequency band element 402, at least one high frequency band element 404, are covered by is mounted a dielectric radome 410. The access point antenna 400 may be mounted on a tower at a cell site, a building, and may be mounted on a cellular on wheels assembly for deployment during periods of greatly increased network traffic within a particular area.

Figure 5:
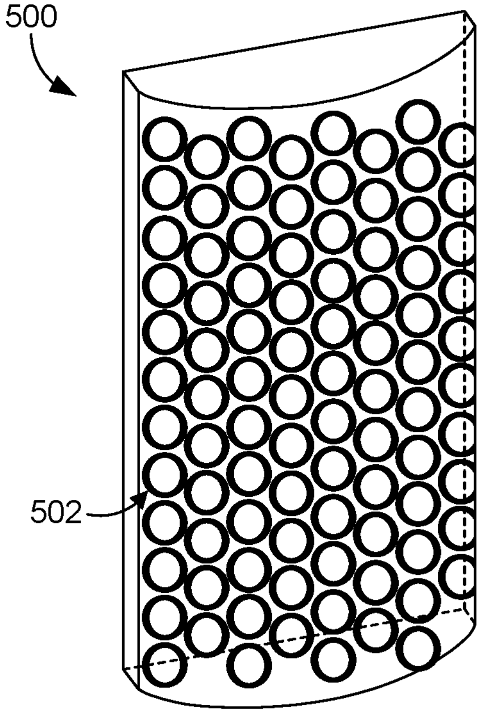
FIG. 5 depicts a frequency selective element pattern for an access point antenna suitable for use in implementations of the present disclosure, in accordance with aspects herein.

FIG. 5 depicts a frequency selective element pattern for an access point antenna 500 suitable for use in implementations of the present disclosure, in accordance with aspects herein. FIG. 5 provides an exemplary aspect illustrating elements 502 on the inside surface of the radome.

Figure 6:
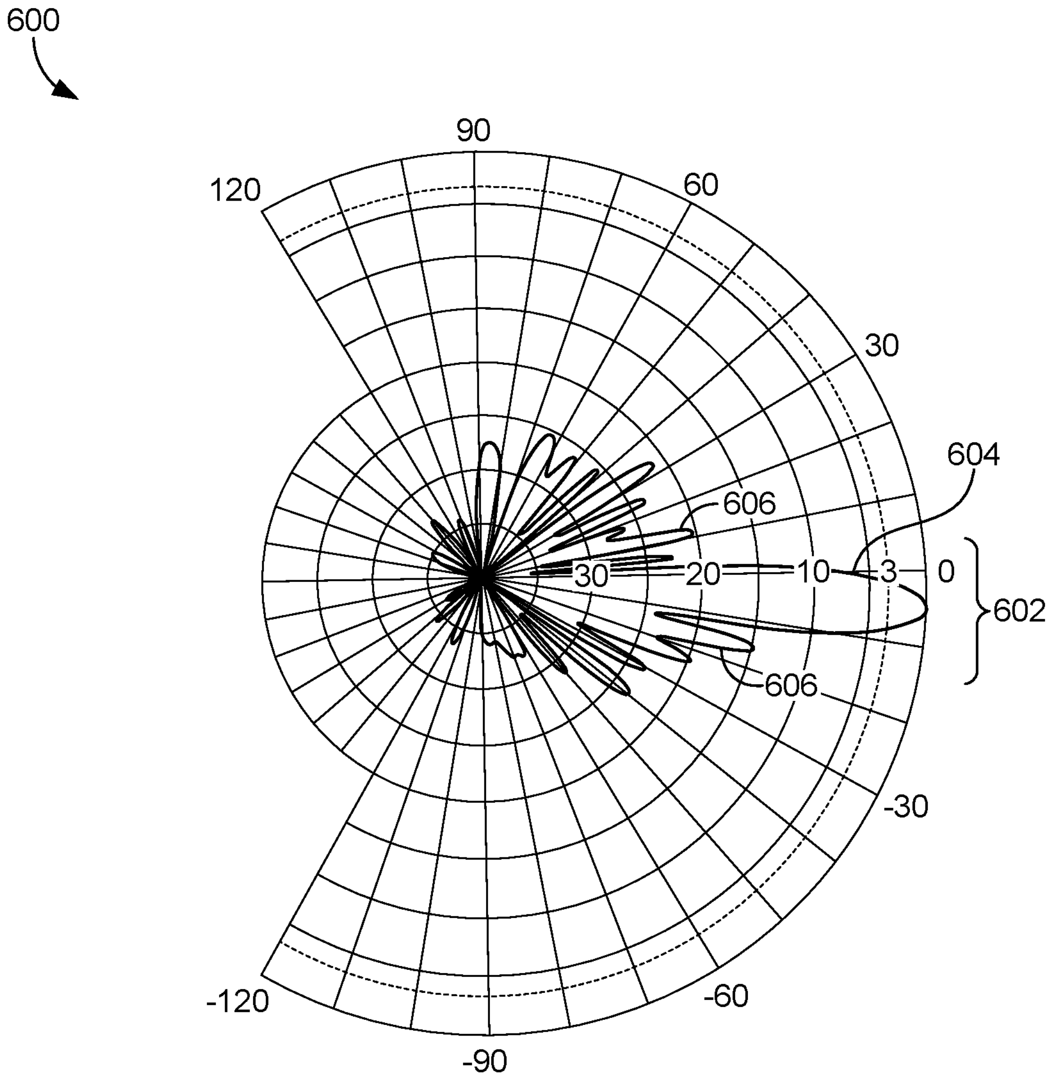
FIG. 6 depicts a radiation pattern for an access point antenna suitable for use in implementations of the present disclosure.

FIG. 6 depicts a radiation pattern for an access point antenna suitable for use in implementations of the present disclosure, in accordance with aspects herein. Antenna radiation pattern diagram 600 provides information about the access point antenna and its expected performance. The orientation of the access point antenna is shown and the directions around the antenna are shown on the outer circle and are marked in degrees. The strength scale from the center to the edge of the pattern is shown in decibels (dB). The antenna radiation pattern 502 is shown as just touching the outer circle at the point of maximum antenna strength. The scale shows the relative strength of signals radiated in any direction with the maximum point centered on 0 dB with respect to all other directions. The antenna radiation pattern 602 represents that relative amount of power radiated at the angles on the outer ring of the antenna radiation pattern diagram 600. Each access point antenna element emits radiation in a specific pattern that is known and the antenna radiation pattern 600 is used merely as an example and is not intended to limit the disclosure to the radiation pattern depicted.

The main lobe 504 reaches a maximum at 0 dB at an angle of 90 degrees. Antennas, including access point antennas, radiate in specific directions and strengths according to the design of the antenna. Antenna radiation pattern diagrams, such as diagram 600, illustrate the antenna's radiated signal in the antenna's far field, which begins several wavelengths from the antenna and extends to infinity. In addition, antennas have a near field region which is close enough to the antenna that the final pattern has not emerged. The antenna radiation pattern diagram 600 indicates the angles, direction, and strength of the radiation emitted by the access point antenna. Knowing an access point antenna's radiation pattern is necessary when mounting the antenna on an access point to ensure that the antenna is aimed to ensure good coverage. Each antenna on an access point, such as the low band antenna elements 402 and the high band antenna elements 404 of the access point antenna 400 shown in FIG. 4 may produce different radiation patterns and may be affected in particular directions by signals radiated by other nearby antennas in directions that interfere with the main lobe 604. For example, main lobe 604 would be adversely affected by a secondary lobe 606 that arrives at 90 degrees.

Access point antennas are designed to emit radiation in one direction, that of the main antenna lobe 604. However, access point antennas also emit radiation outside the main antenna lobe 604. This radiation outside the main antenna lobe 604 may be referred to as antenna sidelobes. While the main antenna lobe 604 is aimed within a particular cell, the antenna sidelobes 606 are not and due to the antenna sidelobes 606 having an angle above the angle of the main antenna lobe 604 the antenna sidelobes 606 may interfere with other nearby antennas and may also interfere with the main antenna lobes 604 in adjacent cells.

FIG. 7 depicts a multi-band access point antenna radome incorporating frequency selective surfaces suitable for use in implementations of the present disclosure, in accordance with aspects herein. The multi-band access point antenna radome 700 incorporates frequency selective surface components 702 on the inside of the curved radome surface. The frequency selective surface components 702 may be constructed from planar metallic array elements and may be patches or apertures, as depicted in FIG. 4. The patches or apertures may be imprinted on a dielectric substrate located on the inside curved radome surface. The frequency selective surface components 702 increase the ability to filter out unwanted RF emissions from the access point antenna environment, whether from another antenna in close proximity or the surrounding area. The design of the frequency selective surface components 702 may be used to shape the multi-band access point antenna 400 radiation pattern to limit emissions in azimuth to the sides and to aid in filtering out interference from antenna sidelobes of adjacent or nearby antennas. The frequency selective surface components 702 may vary across the surface of the multi-band access point antenna radome 700, with frequency selective surface components responsive to particular frequencies or frequency bands placed opposite the antenna elements that transmit and receive in the particular frequency band or frequency.

In operation the multi-band access point antenna radome 700 may allow an incoming signal to pass through the frequency selective surface components 702, depending on the frequency of the incoming signal. Signals that pass through the frequency selective surface components 702 are in a selected frequency band that the multi-band access point antenna 400 uses for operation. Frequencies that are not within the selected frequency band are blocked from passing into the multi-band access point antenna 400 by the multi-band access point antenna radome 700.

The antenna radome 700 may be an RF transparent dielectric radome and designed to operate with the at least one first antenna element and the at least one second antenna element operating on multiple frequency bands of the mobile network. The first frequency element may operate on a low frequency band and the second frequency element may operate on a high frequency band of the mobile network. The antenna radome may deploy the first frequency selective surface opposite the at least one first antenna element and may deploy the second frequency selective surface opposite the at least one second antenna element. Each of the first and second antenna elements may be polarized and may have polarizations different from one another. Furthermore, each antenna radome may be designed specifically for a particular access point antenna and combination of frequencies.

The resonant frequency of operation is dependent on the antenna array element design. An incoming signal may pass through the frequency selective surface components 502 or may be blocked. Transmission and reflection of RF signals occur when the frequency of the incident radiation striking the radome surface tunes with the resonant frequency of the antenna elements located within the multi-band access point antenna radome 500. The frequency selective surface components 702 may be tuned by varying the height of the individual frequency selective surface components, the construction of the elements, as well as the periodicity of the array of the frequency selective surface components 702 on the multi-band access point antenna radome 700. Tuning the frequency selective surface components 702 allows them to operate as spatial filters because the frequency selective surface components impart filtering properties in a spatial domain, the multi-band access point antenna radome 600. The multi-band access point antenna radome 700 also operates to control the directionality of the antenna patterns for the first and second antenna elements.

FIG. 7 depicts a flow diagram of an exemplary method for operating a multi-band access point antenna with a frequency selective surface radome, in accordance with aspects herein. The method 700 begins with receiving, from a user device, a signal on a first frequency at step 702. The method continues in step 704 with filtering, by at least one frequency selective surface responsive to the first frequency, unwanted RF emissions from adjacent antennas on the signal to produce a filtered signal. The method then concludes in step 706 with forwarding the filtered signal to a network switch for transmission.

The first frequency may be in a high frequency band of the network, but may also be in a low frequency band of the network. The unwanted RF emissions are from at least one adjacent antenna that is co-located with the access point antenna. The co-location may an access point tower, a building roof with antenna mounting provisions, or other locations that have multiple antennas operating, such as a television stations. The filtered signal may also be polarized. The frequency selective surfaces may be selected based on frequencies used by at least one antenna that is co-located with the access point antenna.

Figure 8:
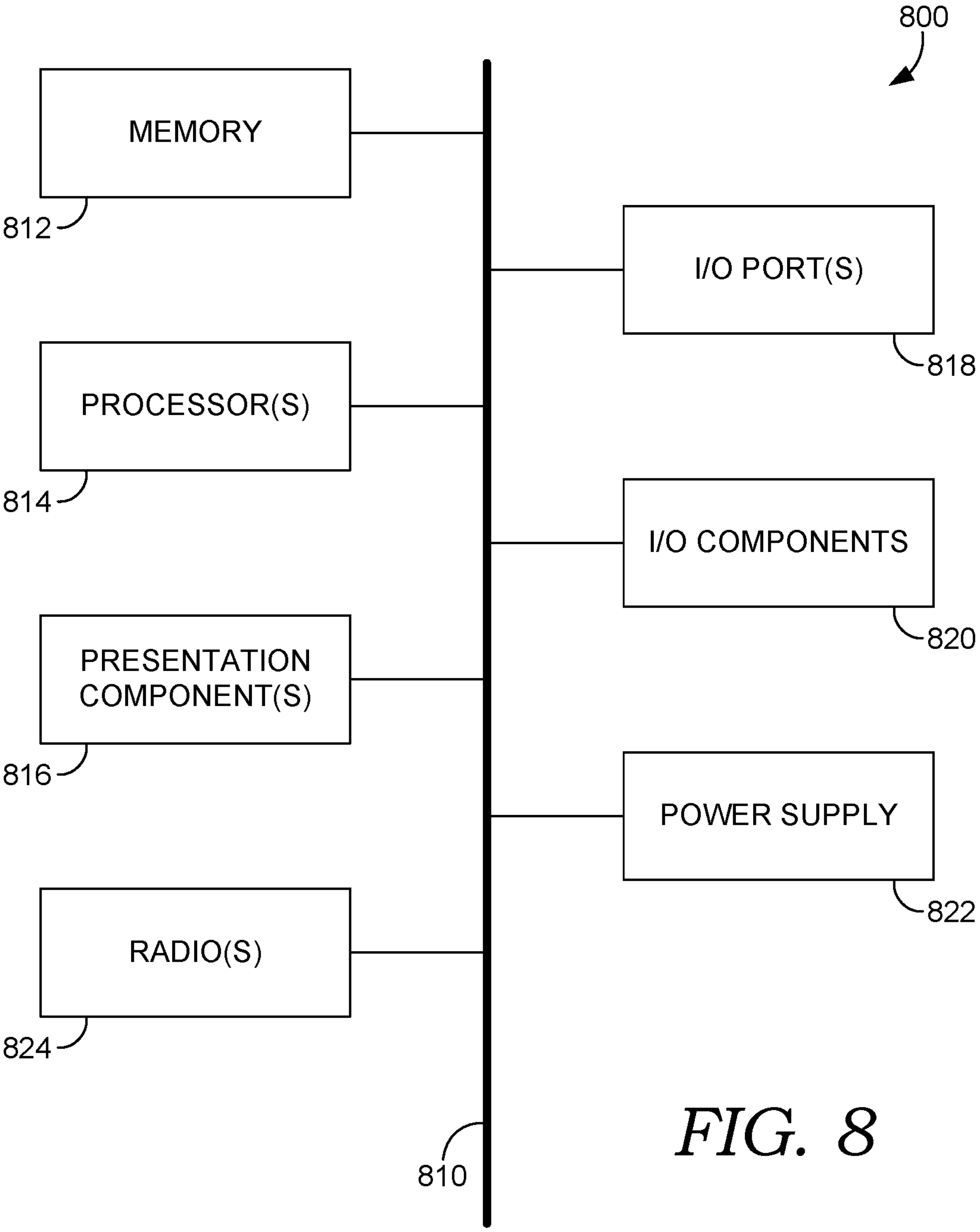
FIG. 8 depicts an exemplary computing device suitable for use in implementations of the present disclosure, in accordance with aspects herein.

FIG. 8 depicts an exemplary computing device suitable for use in implementations of the present disclosure, in accordance with aspects herein. With continued reference to FIG. 8, computing device 800 includes bus 810 that directly or indirectly couples the following devices: memory 812, one or more processors 814, one or more presentation components 816, input/output (I/O) ports 818, I/O components 820, radio(s) 824, and power supply 822. Bus 810 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O components 820. Also, processors, such as one or more processors 814, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. Memory 812 may be removable, nonremovable, or a combination thereof. Exemplary memory includes solid-state memory, hard drives, optical-disc drives, etc. Computing device 800 includes one or more processors 806 that read data from various entities such as bus 810, memory 812 or I/O components 820. One or more presentation components 816 present data indications to a person or other device. Exemplary one or more presentation components 816 include a display device, speaker, printing component, vibrating component, etc. I/O ports 818 allow computing device 700 to be logically coupled to other devices including I/O components 820, some of which may be built into computing device 800.

Illustrative I/O components 820 include a microphone, joystick, game pad, satellite dish, scanner, printer, wireless device, etc.

The radio(s) 824 represents one or more radios that facilitate communication with a wireless telecommunications network. While a single radio 824 is shown in FIG. 8, it is contemplated that there may be more than one radio 824 coupled to the bus 810. Illustrative wireless telecommunications technologies include CDMA, GPRS, TDMA, GSM, and the like. The radio 824 may additionally or alternatively facilitate other types of wireless communications including Wi-Fi, WiMAX, LTE, 3G, 4G, LTE, 5G, NR, VOLTE, or other VOIP communications. As can be appreciated, in various embodiments, radio 824 can be configured to support multiple technologies and/or multiple radios can be utilized to support multiple technologies. A wireless telecommunications network might include an array of devices, which are not shown so as to not obscure more relevant aspects of the invention. Components such as an access point, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An access point antenna comprising frequency selective surface elements, the antenna comprising:

at least one first antenna element mounted on a first location of an antenna support structure;

at least one second antenna element mounted on a second location of the antenna support structure; and an antenna radome covering the antenna support structure, wherein the antenna radome comprises frequency selective surface components on an interior surface of the antenna radome, the frequency selective surfaces comprising at least one first frequency selective surface component responsive to filter unwanted radio frequency (RF) emissions from at least one antenna co-located with the access point antenna affecting the at least one first antenna element and at least one second frequency selective surface component responsive to filter unwanted RF emissions from the at least one antenna co-located with the access point antenna affecting the at least one second antenna element.

2. The antenna of claim 1, wherein the antenna radome is an RF transparent dielectric radome.

3. The antenna of claim 1, wherein the at least one first antenna element operates on a low frequency band of a mobile network.

4. The antenna of claim 1, wherein the at least one second antenna element operates on a high frequency band of a mobile network.

5. The antenna of claim 1, wherein the antenna support structure comprises a reflector.

6. The antenna of claim 1, wherein the at least one first frequency selective surface is placed on the radome opposite the at least one first antenna element.

7. The antenna of claim 1, wherein the at least one second frequency selective surface is placed on the radome opposite the at least one second antenna element.

8. The antenna of claim 1, wherein the unwanted RF emissions affecting the at least one first antenna element are emissions from a first antenna co-located with the access point antenna.

9. The antenna of claim 1, wherein the unwanted RF emissions affecting the at least one second antenna element are emissions from a second antenna co-located with the access point antenna.

10. The antenna of claim 1, wherein the at least one first frequency selective surface has a first polarization.

11. The antenna of claim 1, wherein the at least one second frequency selective surface has a first polarization.

12. A method for operating an access point antenna in a network, the method, comprising:

receiving, from a user device, a signal on a first frequency;

filtering, by at least one frequency selective surface responsive to the first frequency, unwanted radio frequency (RF) emissions from adjacent antennas co-located with the access point antenna on the signal to produce a filtered signal; and forwarding the filtered signal to a network switch for transmission.

13. The method of claim 12, wherein the first frequency is in a low frequency band of the network.

14. The method of claim 12, wherein the first frequency is in a high frequency band of the network.

15. The method of claim 12, wherein the unwanted RF emissions are from at least one adjacent antenna co-located with the access point antenna.

16. The method of claim 12, wherein the filtered signal is polarized.

17. The method of claim 12, wherein the at least one frequency selective surface is selected based on frequencies used by at least one antenna co-located with the access point antenna.

18. A non-transitory computer storage media storing computer-usable instructions that, when used by one or more processors, cause the processor to:

receive, from a user device, a signal on a first frequency;

filter, by at least one frequency selective surface responsive to the first frequency, unwanted radio frequency (RF) emissions from adjacent antennas co-located with the access point antenna on the signal to produce a filtered signal; and forward the filtered signal to a network switch for transmission.

19. The non-transitory computer storage media of claim 16, wherein the first frequency is in a low frequency band of the network.

20. The non-transitory computer storage media of claim 16, wherein the first frequency is in a high frequency band of the network.

* * * * *